Aug. 1, 1961 E. ALBERS-SCHOENBERG 2,994,522
PROCESS AND APPARATUS FOR FIRING CERAMIC FERRITES
Filed June 2, 1960 2 Sheets-Sheet 1

INVENTOR
ERNST ALBERS-SCHOENBERG

BY Greene, Pinelea & Durr
ATTORNEY

INVENTOR
ERNST ALBERS-SCHOENBERG

United States Patent Office 2,994,522
Patented Aug. 1, 1961

2,994,522
PROCESS AND APPARATUS FOR FIRING CERAMIC FERRITES
Ernst Albers-Schoenberg, Metuchen, N.J., assignor to Indiana General Corporation, Valparaiso, Ind., a corporation of Indiana
Filed June 2, 1960, Ser. No. 33,547
3 Claims. (Cl. 263—41)

This invention relates to a process and apparatus for firing metallic oxide type of ceramic materials which are sensitive to oxygen during firing and especially ferrites of the general formula $x(Mn, M)O \cdot yFe_2O_3$ in which $x$ is approximately equal to $y$ and in which the manganese is an essential constituent thereof.

This application is a continuation-in-part of U.S. application Serial No. 640,031, filed February 13, 1957, now abandoned.

Although the process and apparatus is especially suited for the firing of manganese ferrites it is also adapted for firing other oxygen sensitive ceramic materials. The manganese containing ferrites, however, present a special problem in firing owing to the tendency of the manganese component to combine with oxygen in excess of the amount of oxygen required to provide the desirable properties.

In order to guard against the excessive uptake of oxygen by the manganese component special precautions have been taken heretofore. For example, a well-known type of protective gas tunnel oven combines the following features: the kiln is electrically heated by "globars"; its case is completely sealed and lock-doors are fitted to the ends of the tunnel. The gas for the atmosphere inside the kiln, for example, is a mixture of nitrogen and carbon dioxide and enters through a number of inlet-tubes filling the whole tunnel-muffle as well as the kiln-case.

Among the objects of the invention is to provide an improved process and apparatus for the firing of oxygen sensitive ferrites.

One phase of this invention is based on the discovery that neutral or oxidizing atmospheric conditions can be regulated within an unsealed kiln aided somewhat by the effect that the heat (or other conditions) within the kiln produces on the movement of gases therein.

In the firing in a sealed kiln such as described above, it is usually necessary to preliminarily dry and heat treat the molded unfired bodies prior to firing, since the protective atmosphere inside of the sealed kiln is not capable of burning out the organic additives in the molded products which provide for temporarily binding the powdered ceramic ingredients together.

Another phase of the invention relates to an improved process and apparatus which overcomes the necessity of preliminary drying or heat treating such oxygen sensitive ferrites as a separate step or in a separate apparatus prior to the final firing treatment.

The objects of the invention are attained by providing a tunnel kiln in which the muffle thereof is not sealed, in which at least the entrance end thereof is open to the atmosphere and in which both ends thereof may be open, i.e., include no lock-doors. The kiln is provided with a burn-out section, a firing section and a cooling section; and in addition one or more pipe connections, one of which is adjacent the region where the cooling tract of the muffle connects to the center section, through which pipe connection an inert or neutral gas, for example, water vapor is adapted to be introduced. Instead of filling the whole kiln with a protective gas, an ample amount of water vapor, or an inert, or neutral gas is blown into the center or firing section and the cooling tract of the muffle. If desired an oxidizing gas may also be introduced into the kiln where ferrites being fired require such atmospheric conditions. An opening is provided in the muffle between the burn-out section and the firing section to admit air or other oxidizing gas to the burn-out section. This makes a kiln of more general utility. By regulating the flow of the gases or vapors in the pipe connection any desired concentration of oxygen may be obtained in the various stages of the firing. In addition to this structure, it has been found that a very precise control of the atmosphere (in the critical regions where the atmosphere influences the properties of the product) may be obtained by positively withdrawing gas from the kiln adjacent one or both ends of the firing section. Pipe connections, with suitable valves, etc., may be provided for this purpose.

The invention both as to its organization and its method of operation together with additional objects and advantages thereof will be best understood from the following description of a specific embodiment thereof when read in connection with the accompanying drawing in which.

Figure 1:
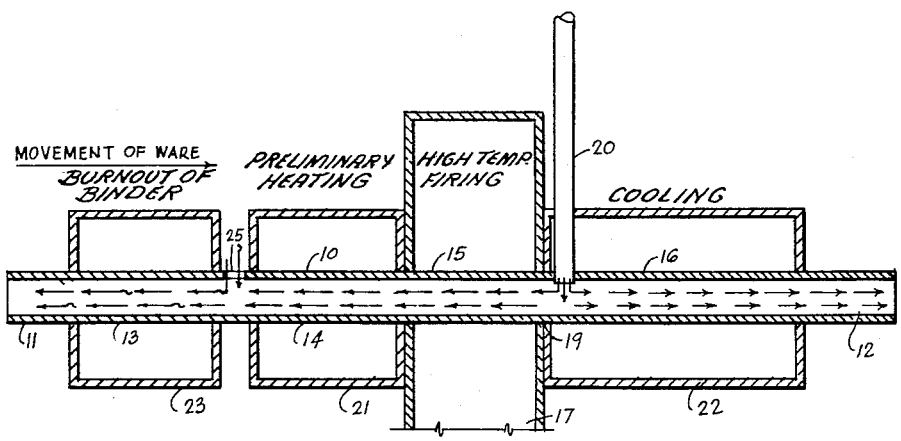
FIG. 1 is a longitudinal cross sectional view of one form of the invention.

The kiln of FIG. 1 comprises the muffle 10 extending therethrough having the entrance end 11 and exit end 12. Suitable tracks or other means (not shown) may be provided in the muffle to guide the materials to be fired through the furnace. In the muffle, four more or less arbitrary zones may be distinguished, first the preliminary burn out or preliminary treating zone 13, second, a second preliminary heating zone 14, third, the high firing zone 15, and fourth, the cooling zone 16. The zones 13 and 14 may be considered as parts of the same zone. The center or high firing zone 15 of the furnace is surrounded by fire box 17 which may be heated in any desired way to the firing temperature of the product to be manufactured.

Adjacent the end 19 of the fire box 15 an injection tube 20 is positioned to admit vapor or inert gas into the muffle 10. The end portion 16 of the muffle is surrounded by an insulating chamber or jacket 22 adapted to provide uniformity of cooling treatment. Similar insulating means 21 and 23 may be provided around the zones 14 and 13, respectively, of muffle 10. No doors are required either at the entrance end 11 or the exit end 12 of the muffle 10 and no doors or closures are required at any region within muffle 10 although, if desired, doors or closure means may be provided.

A second pipe or preferably just an opening 25 is provided at a region within the muffle between the prefiring zones 14 and 13. This opening provides sufficient oxygen for burning out the binders of the ceramic products. Part of the air entering at opening 25 follows the path pattern set up by vapor from pipe 20, i.e., towards end 11 of the muffle 10.

In detail, the performance of this type of kiln is as follows: If the water vapor 24 is blown into the end of the high fire zone or, right next to the high fire zone 15, a little toward the exit 12, a part of the vapor moves toward the high fire zone 15 and entrance end 11, while the remainder enters the cooling tract 16 and escapes at the exit end 12.

This is exactly what is desirable. The ware, after entering the kiln and in the stage of being warmed up in region 13 does not encounter any gas mixture that could be called protective. The oxygen or air required for burning out organic binders, etc., may enter through opening 25 and moves toward entrance end 11. The exact amount of air or oxygen is not critical although there should be at least a slight surplus over the amount required to remove the organic binders. In some cases the opening 25 is made large enough to make all water vapor or inert gas that reaches this point of the muffle escape into the free air. Under these circumstances the burn-out kiln acts as an independent oxidizing low-temperature kiln unit. On their way the parts gradually move into a surrounding of lower and lower oxygen content, until in the region adjacent to where the high temperature firing zone connects to the cooling zone the full effect of the gas or vapor introduced at 20 takes place. The protection is maintained through the cooling part of the kiln and only at the very end where the product is at a rather low temperature may some air diffuse into the escaping water vapor.

It is evident that this type of kiln is of extremely simple design and also cheap to operate. Gas or oil heating which is cheaper than electrical heating may be employed to heat chambers 17, 23 and/or 21. There is no wear and replacement of "globar" heating-elements. There are no transformers. The casing or muffle of the kiln need not be sealed. The ends are open. The cheapest of all protective gases (and the safest in handling), water vapor, may be employed as the vapor introduced at 20.

All this is combined with the advantage that the pieces on their way through the kiln move through zones of different oxygen content which is exactly the correct way of firing manganese containing ferrites. No separate preheating treatment of the pressed or extruded ware, to burn out the binders, is necessary.

Figure 2:
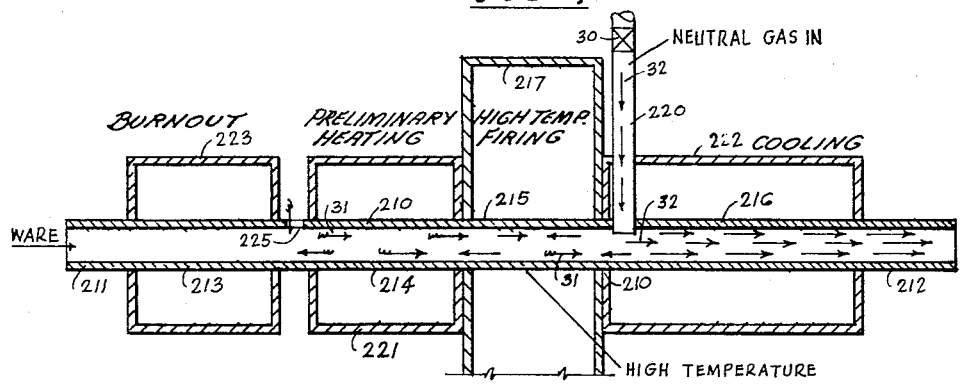
FIG. 2 is a view similar to FIG. 1 of a modified form of the invention.
Figure 2A:
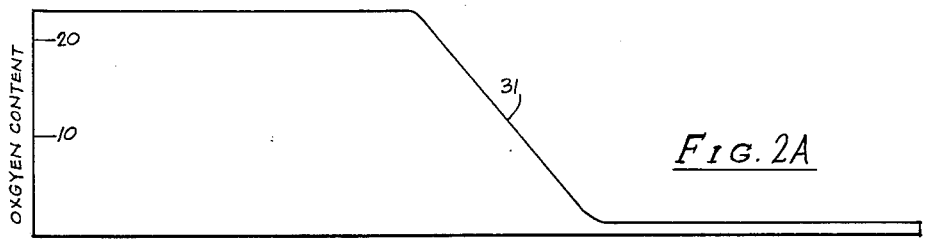
FIG. 2A is a graph showing the oxygen concentration of the kiln of FIG. 2.

The process and apparatus of FIG. 2 is very similar to that of FIG. 1 but in FIG. 2, flow regulating means 30 (shown diagrammatically) has been added and by adjustments of this flow regulating means or valve, the gas flow may be regulated as shown in the figure wherein the arrows 31 with wavy tails represent air flow and the arrows 32 with straight tails represent neutral gas. It will be seen that by this structure it is possible to regulate the gas flow so that there is a slight intermingling of gases in the high firing section and a substantial absence of oxygen during the cooling period or shortly after the cooling period starts. The curve 31' of FIG. 2A shows the approximate oxygen content of the atmosphere along the length of the kiln of FIG. 2.

Figure 3:
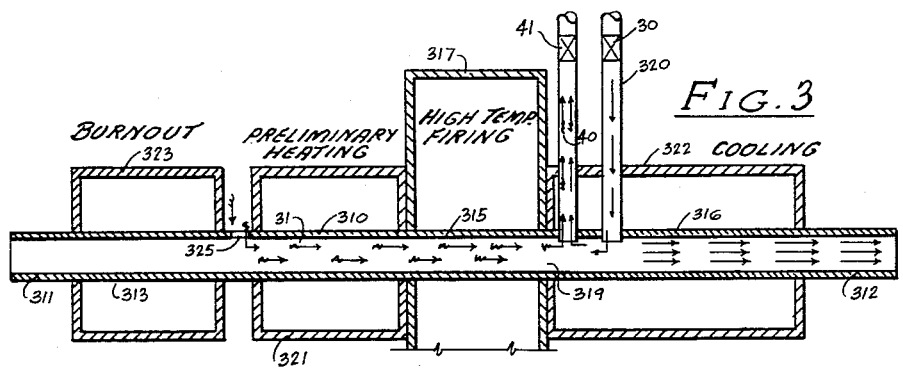
FIG. 3 is another modified form of the kiln of the invention.
Figure 3A:
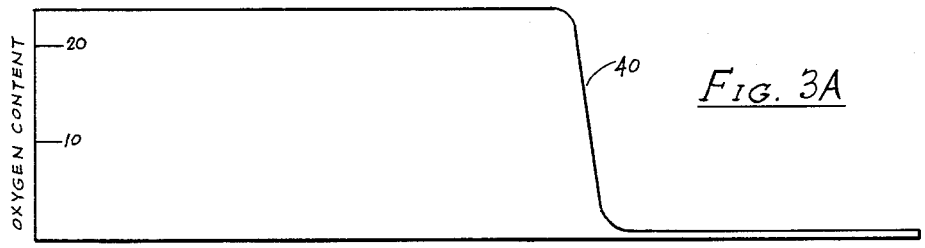
FIG. 3A is a graph showing the oxygen concentration along the length of the kiln of FIG. 3.

The modified form of invention shown in FIG. 3 illustrates a further development. It has been found that there is only a very slight tendency for neutral gas admitted through conduit 320, for example, to flow backwards toward the high temperature zone; it almost appears as if the high temperature at the exit end 319 of the high temperature zone acts as a shield to prevent the movement of gas introduced by conduit 320 in that direction. Therefore, the conduit 40 has been provided. Conduit 40 is equipped with a flow regulating means or valve 41 and is connected to an exhaust fan or similar gas-withdrawing means. Withdrawal of gas from the muffle 310 through conduit 40 effects a relatively sudden removal of oxygen as indicated by the graph 40' of FIG. 3A.

Figure 4:
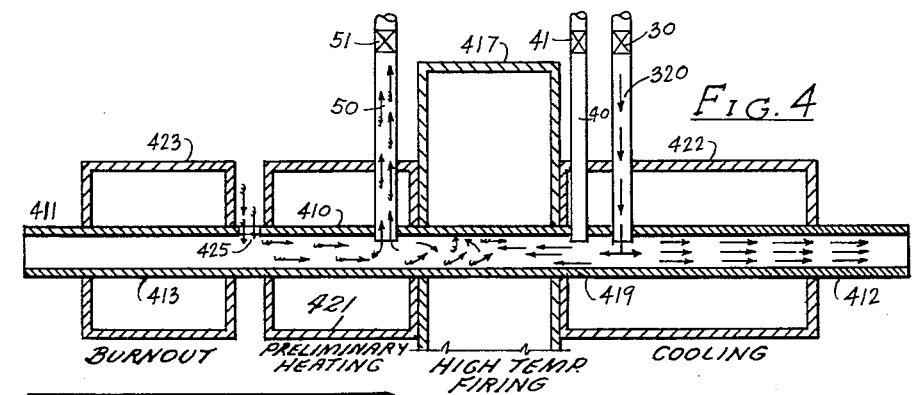
FIG. 4 is still another modified form of kiln.
Figure 4A:
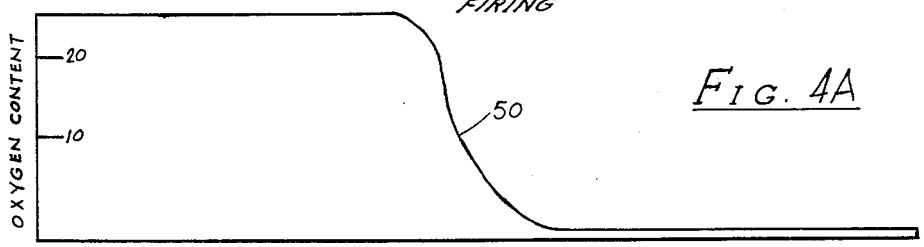
FIG. 4A is a graph showing the oxygen concentration along the kiln of FIG. 4.

According to the modified form of the invention shown in FIG. 4, a gas withdrawing conduit 50 is positioned adjacent the entrance side of the high temperature zones. When operated as illustrated in this figure (by the arrows showing the flow of gases) conduit 40 remains closed. With this structure the oxygen content in the high temperature zone may be regulated, for example, as shown by curve 50' in FIG. 4A.

The features of the invention which provide a much simplified form of furnace which operates as well or better than the sealed type of controlled atmosphere furnaces appear to be based on the discovery that the presence of oxygen during the high temperature firing has been over emphasized. Where ferrites which are sensitive to excess of oxygen are fired at relatively high temperatures, for example, there appears to be no danger of oxygen take-up while the temperatures are close to the maximum and in fact, the presence of relatively small amounts of oxygen may prevent undesirable losses. Substantially all of the danger of undesired oxygen take-up appears to occur during the cooling cycle.

The tendency of the high temperature gases at the exit area of the high temperature zone to act as a shield to prevent any substantial amount of inert gas (introduced by conduit 20, 220 or 320) from passing backward through the high temperature zone increases the efficiency of the inert gas in sweeping out oxygen from the cooling zone.

The features and principles underlying the invention described above in connection with specific exemplifications will suggest to those skilled in the art many other modifications thereof.

I claim:

1. In a process of firing shaped ferrite materials which require a mildly oxidizing atmosphere in the first steps of firing but are sensitive to oxygen atmosphere at the ceramic firing temperature and during cooling, the steps comprising providing molded bodies of ferrite composition which are bonded by an organic bonding agent, continuously passing said molded bodies through a connected series of heat treating zones comprising a preliminary heating zone, a high temperature firing zone and a cooling zone while permitting free access of air to the entrance end of said preliminary heating zone, admitting air to the region between the entrance end of the preliminary heating zone and the high fire zone, injecting a neutral gaseous material into the zones at the region adjacent to where the high temperature firing zone connects to the cooling zone whereby said neutral gaseous material provides a flowing and substantially completely neutral atmosphere in said high temperature firing and said cooling zones.

2. In a process of firing shaped ferrite materials which require a mildly oxidizing atmosphere in the first steps of firing but are sensitive to oxygen during cooling, the steps comprising providing molded bodies of ferrite compositions which are bonded by an organic bonding agent, continuously passing said molded bodies through a connected series of heat treating zones comprising a preliminary heating zone, a high-temperature firing zone, and a cooling zone, while admitting air to the region between the entrance end of the preliminary heating zone and the exit end of the high-fire zone, injecting a neutral gaseous material into a region lower in temperature than the high-fire zone but adjacent to where the high temperature firing zone connects to the cooling zone whereby said neutral gaseous material provides a flowing and substantially neutral atmosphere in the cooling zone.

3. In a protective gas tunnel kiln for firing ware which in the first phase of firing requires a mildly oxidizing atmosphere and in the high firing step and cooling step requires an atmosphere which is almost neutral to completely neutral, said tunnel kiln comprising a muffle having a preliminary treating section, a high firing treatment section and a cooling section, said muffle being open to the atmosphere at the entrance end, pipe means attached at one end to said muffle to open into the same in the region adjacent to the area where the high firing treatment section joins said cooling section, said pipe means being adapted to introduce a protective neutral vapor into said muffle in sufficient quantities to provide a flowing neutral atmosphere in at least part of the high-fire and the cooling sections, said preliminary heat treating section comprising two spaced heat-treating chambers surrounding the muffle, the portion of said muffle between said two heat-treating chambers comprising an opening for admitting air to said muffle.

No references cited.